United States Patent [19]

Waybright

[11] 4,345,275
[45] Aug. 17, 1982

[54] HIGH VOLTAGE PROTECTION CIRCUIT FOR A TELEVISION RECEIVER

[75] Inventor: George C. Waybright, Carmel, Ind.

[73] Assignee: RCA Corporation, New York, N.Y.

[21] Appl. No.: 225,811

[22] Filed: Jan. 16, 1981

[51] Int. Cl.[3] .......................................... H04N 5/68
[52] U.S. Cl. .................................................. 358/243
[58] Field of Search ............... 358/190, 243; 328/259, 328/8, 9

[56] References Cited

U.S. PATENT DOCUMENTS

| | | | |
|---|---|---|---|
| 3,692,932 | 9/1972 | Wilmarth | 178/7.5 R |
| 3,725,739 | 4/1973 | Griffey | 317/16 |
| 3,795,767 | 3/1974 | Waltner et al. | 358/243 |
| 3,898,522 | 8/1975 | Klein | 315/379 |
| 4,042,858 | 8/1977 | Collette et al. | 315/379 |
| 4,045,742 | 8/1977 | Meehan et al. | 328/9 |
| 4,073,004 | 2/1978 | Chambers et al. | 363/79 |
| 4,126,816 | 11/1978 | Willis | 315/411 |
| 4,185,234 | 1/1980 | Baker | 315/411 |
| 4,213,166 | 7/1980 | Watanabe | 361/86 |
| 4,287,535 | 9/1981 | Vakil | 358/243 |

OTHER PUBLICATIONS

Hitachi, CU-150 Solid State Color Televsion Service Manual No. 344, CQ3DX Chassis, pg. 1-9 & Electrical Schematic, Oct. 1976.
RCA Corp. Training Manual WS21, "CTC 108 Television Workshop, Servicing the CTC 108 XL-100 Color Chassis", pp. 1, 3, 48 & 49, Copyright 1980.
RCA Television Service Data, File 1980 C-5, Chassis CTS 108 Series, Copyright 1980.
Electrical Schematic, Magnavox T989 Color Television Chassis, Manual No. 7343, Section 4.1, Fourth Issue: Mar. 1975.

Primary Examiner—Robert L. Richardson
Attorney, Agent, or Firm—E. M. Whitacre; P. J. Rasmussen; J. Laks

[57] ABSTRACT

A high voltage generator of a television receiver is responsive to an alternating voltage, such as a retrace pulse voltage, and develops an ultor voltage at an ultor terminal. A high voltage protection circuit includes a comparator that, when activated, disables normal television display. A sense voltage representative of the ultor voltage is coupled to an input terminal of the comparator so as to activate the comparator when the ultor voltage exceeds a predetermined threshold level. A sense voltage representative of the ultor beam current is also coupled to an input terminal of the comparator so as to vary the threshold ultor voltage level at which the comparator is activated in accordance with beam current variations. When the ultor beam current exceeds a level indicative of high voltage generator overload, a switch that is coupled to an input terminal of the comparator changes states to activate the comparator and shut down the high voltage generator.

30 Claims, 1 Drawing Figure

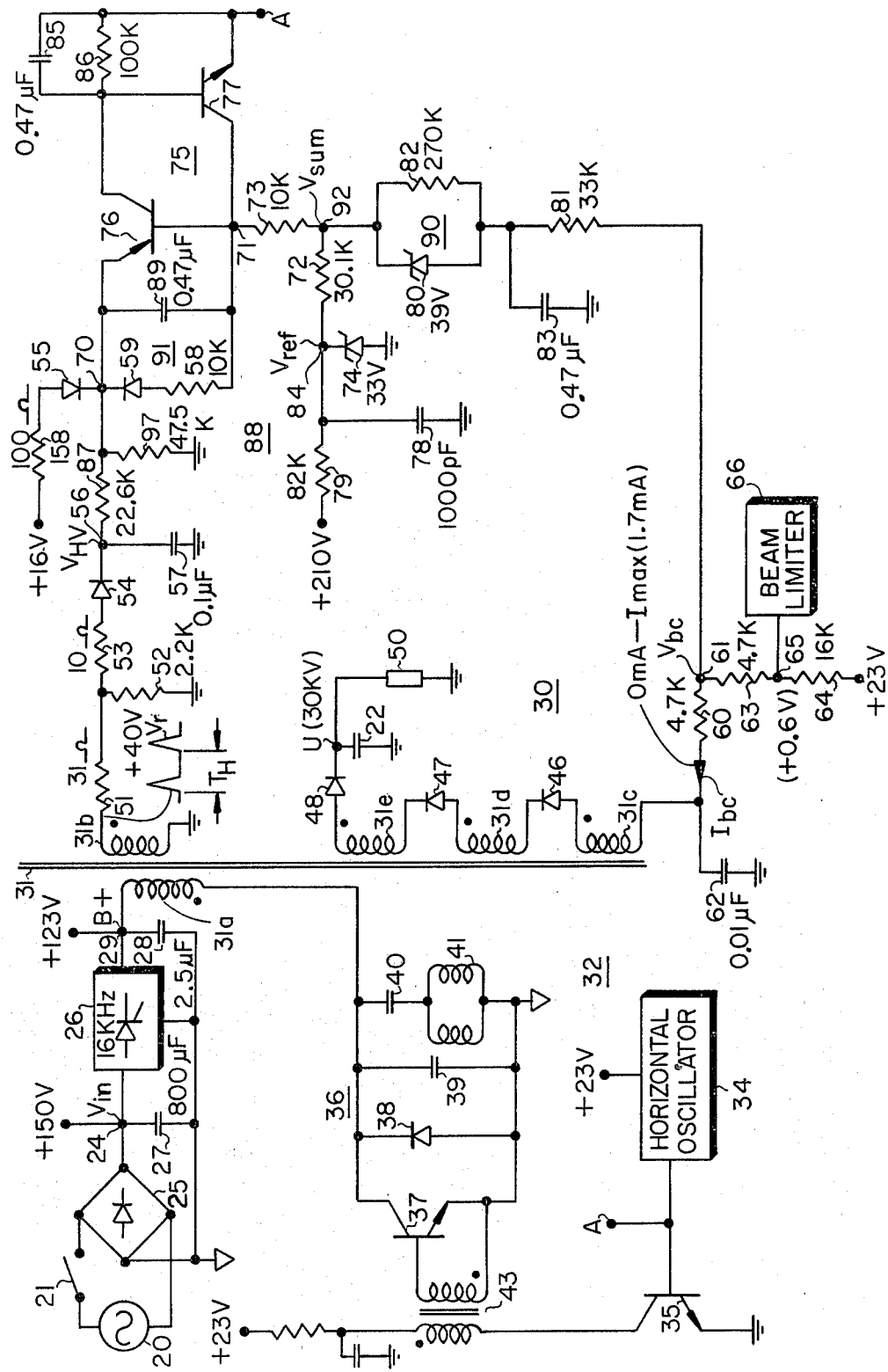

HIGH VOLTAGE PROTECTION CIRCUIT FOR A TELEVISION RECEIVER

This invention relates to high voltage protection circuits for television receivers or television displays. In a typical television receiver, a DC ultor voltage developed by a high voltage generator is applied to the final anode electrode of a picture tube to accelerate onto a phosphor screen an electron beam generated at the picture tube cathode. To insure that the television receiver is not operated under fault conditions at excessive ultor voltage levels, the television receiver may incorporate a high voltage protection circuit which disables normal television display by, for example, shutting down the high voltage generator when the ultor voltage approaches unacceptable values. The high voltage protection circuit may incorporate a comparator which, when activated, shuts down the high voltage generator. A sense voltage representative of the ultor voltage is applied to an input terminal of the comparator. A reference voltage is applied to another input terminal. When the ultor voltage sense voltage exceeds a threshold level established by the reference voltage, the comparator is activated to disable the television receiver and high voltage generator.

A feature of the invention is to provide a shutdown capability during an overcurrent condition such as during the overloading of the ultor terminal by excessive beam current draw. Another feature of the invention is to vary, as a function of beam current loading, the ultor voltage threshold above which the shutdown comparator is activated. Such an arrangement enables the comparator to be activated at lower ultor voltage thresholds when the beam current loading is heavy without unnecessarily activating the comparator when the beam current loading is light and higher ultor voltages may be tolerated.

A high voltage generator responsive to an alternating voltage develops an ultor voltage at an ultor terminal. A sense voltage representative of the ultor voltage is applied to a comparator so as to activate the comparator to develop the disabling signal when the ultor voltage exceeds a threshold level. A sense voltage representative of the beam current is applied to the comparator so as to vary the ultor voltage threshold level with variations in the beam current sense voltage. A switch coupled to the comparator and responsive to an overcurrent fault condition changes states when the fault condition occurs to activate the comparator and produce the disabling signal.

In accordance with another feature of the invention, a filter is coupled across two input terminals of the comparator. The filter comprises a capacitance and the series arrangement of a diode and a resistance coupled across the capacitance. The diode is conductive during normal television display operation and develops a voltage across the capacitance in accordance with the value selected for the resistance. The precharging of the capacitance during normal television display operation prevents the comparator from being activated during transient operating conditions that may occur within the high voltage generator during normal television display operation but are not significant enough to warrant activation of the comparator and shutdown of the high voltage generator.

The FIGURE illustrates a deflection circuit and high voltage generator with a protection circuit embodying the invention.

In the FIGURE, a mains supply voltage from a source 20 is coupled through an on-off switch 21, rectified by a full-wave bridge rectifier 25, and filtered by a capacitor 27 to develop an unregulated DC supply voltage, $V_{in}$, of illustratively +150 volts, at a terminal 24. A voltage regulator 26 develops a regulated B+ scan supply voltage, of illustratively +123 volts DC, at a B+ terminal 29. A filter capacitor 28 is coupled to B+ terminal 29.

The B+ scan supply voltage energizes a horizontal deflection generator 32 to develop scanning current in a horizontal deflection winding during each deflection cycle. The generator includes a horizontal oscillator 34, a driver transistor 35, a driver transformer 43, and a horizontal output stage 36. Horizontal output stage 36 comprises a horizontal output transistor 37, a damper diode 38, a retrace capacitor 39, and the series arrangement of an S-shaping capacitor 40 and horizontal deflection winding 41. After horizontal output transistor 37 is cut off, a retrace pulse voltage is developed across horizontal deflection winding 41. The retrace pulse voltage is applied to a primary winding 31a of a flyback transformer 31 to develop retrace pulse voltages in the various secondary windings of the flyback transformer including windings 31b–31e, illustrated in the FIGURE. Windings 31c–31e are part of a high voltage generator 30. Stepped-up retrace pulse voltages developed across high voltage windings 31c–31e are rectified by diodes 46–48, filtered by a capacitance 22 to develop a DC ultor voltage at an ultor terminal U for the ultor load of a television receiver picture tube, illustrated schematically in the FIGURE as an impedance 50.

The DC path for the ultor beam current flowing from ultor terminal U to ultor load 50 is from a terminal 65 through a resistor 63 to a terminal 61. The bottom of high voltage winding 31c is coupled to terminal 61 through a resistor 60 and is coupled to ground through a filter capacitor 62. Terminal 65 is the junction terminal of a voltage divider comprising resistor 63 and a resistor 64 coupled between terminal 61 and a +23 volt DC supply. A conventional beam current limiter circuit 66 is coupled to terminal 65 and maintains the voltage at that terminal relatively constant until beam limiting action begins. Terminal 61 therefore comprises a beam current sense terminal, and the voltage $V_{bc}$ developed at terminal 61 represents an ultor beam current representative sense voltage which varies with variations in the average ultor beam current $I_{bc}$ being drawn from ultor terminal U and flowing through resistor 60, high voltage windings 31c–31e and the high voltage rectifier arrangement of diodes 46–48.

A high voltage protection circuit 88 disables normal television display or receiver operation under fault conditions, such as during the generation of excessive ultor voltage at terminal U. Protection circuit 88 includes flyback transformer secondary winding 31b which develops an ultor voltage representative sense voltage $V_{HV}$ at an ultor voltage sense terminal 56, a comparator transistor 76, a current signal coupling circuit 90, and a latching or disabling transistor 77.

The retrace pulse voltage, $V_r$, developed across flyback transformer winding 31b is divided by voltage dividing resistors 51 and 52 and applied through a resistor 53 to the anode of a diode 54. The peak rectified retrace pulse voltage is filtered by a capacitor 57 to produce the DC voltage $V_{HV}$ that is representative of the retrace pulse amplitude and thus is a sense voltage representative of the magnitude of the ultor voltage being developed at ultor terminal U. The ultor voltage sense voltage $V_{HV}$ is divided by voltage dividing resistors 87 and 97 and applied to the emitter input terminal 70 of comparator transistor 76. A +33 volt reference voltage $V_{ref}$ developed at a terminal 84 is applied through a resistor 72 and a resistor 73 to the base input terminal 71 of comparator transistor 76. The reference voltage $V_{ref}$ is developed across a reference voltage diode 74 with a bias current for the diode being supplied from a +210 volt supply through a resistor 79. A capacitor 78 is coupled across reference diode 74.

A filter 91 is coupled across the two input terminals 70 and 71 of comparator transistor 76. The filter comprises a capacitor 89 and the series arrangement of a resistor 58 and a diode 59, with the cathode of diode 59 coupled to the emitter of transistor 76.

Under normal ultor voltage and beam current operating conditions, the ultor sense voltage $V_{HV}$ is insufficient to block conduction of diode 59. Current for the normally conducting diode 59 flows from reference voltage terminal 84 through resistors 72, 73 and 58. The voltage at the emitter of transistor 76 is therefore lower than the voltage at the base by the voltage drop developed across the series arrangement of resistor 58 and diode 59, thereby reverse biasing the transistor.

To provide beam current information to comparator transistor 76 of high voltage protection circuit 88, beam current sense terminal 61 is coupled through a resistor 81 and the current signal coupling circuit 90 to a terminal 92, the junction terminal of resistors 72 and 73. A filter capacitor 83 is coupled to resistor 81. Signal coupling circuit 90 comprises an impedance or resistor 82 and a reverse breakdown or zener diode 80 coupled thereacross.

At zero beam current loading, the voltage $V_{bc}$ at beam current sense terminal 61 is near that of the voltage being developed at beam limiter input terminal 65, illustratively near ground potential in the FIGURE. As the beam current $I_{bc}$ increases, the voltage $V_{bc}$ decreases and becomes negative. At the beam current draw of $I_{max}$, beam limiter circuit 66 begins to operate and prevent the beam current from increasing significantly beyond the current $I_{max}$.

Under normal beam current loading conditions, that is, under loading conditions of $I_{bc}$ between zero and $I_{max}$, zener diode 80 of current signal coupling circuit 90 is nonconductive. Current flows from terminal 84 to the beam current sense terminal 61 through resistor 72, resistor 82, and resistor 81. The current in resistor 82 therefore increases as the beam current $I_{bc}$ increases.

The voltage $V_{sum}$ developed at terminal 92 and applied to the base input terminal 71 of comparator transistor 76 comprises the proportional sum of the reference voltage $V_{ref}$ and the beam current sense voltage $V_{bc}$, with the constants of proportionality being determined by the values of resistors 72, 81 and 82. The summation voltage $V_{sum}$ therefore varies with beam current loading and decreases with increasing beam current $I_{bc}$.

Comparator transistor 76 compares the ultor voltage sense voltage $V_{HV}$ against the summation voltage $V_{sum}$. Under normal ultor voltage and beam current loading conditions, the ultor voltage sense voltage $V_{HV}$ is insufficient to block conduction of diode 59 and transistor 76 is reverse biased. If, under abnormal operating conditions of high voltage generator 30, the ultor voltage exceeds a predetermined threshold level, the ultor voltage sense voltage $V_{HV}$ increases sufficiently to reverse bias diode 59 and activate comparator transistor 76 into conduction by forward biasing its base-emitter junction.

Transistor 76 and a transistor 77 form a regenerative latch 75 which is energized by activation of comparator transistor 76. When energized, latch 75 develops a disabling signal at a terminal A in the form of latch current flowing out of the emitter of transistor 77. Terminal A is coupled to the base of horizontal driver transistor 35. The disabling signal latch current flowing out of terminal A forward biases driver transistor 35 and maintains it continuously conducting so long as latch 75 is energized. With driver transistor 35 being maintained continuously conducting by latch 75, horizontal deflection generator 32 is disabled, disabling and shutting down high voltage generator 30 and removing the ultor voltage from terminal U.

When comparator transistor 76 is activated and energizes latch 75, sustaining current for the latch is first obtained from ultor voltage sense terminal 56 and then from a +16 volt supply through a resistor 158 and a diode 55 when the voltage at terminal 56 has decreased sufficiently to forward bias diode 55. If both the +16 volt supply and the +23 volt supply for horizontal oscillator 34 and driver transistor 35 are derived from the voltages developed across flyback transformer secondary windings, the +16 volt supply should be designed to decay slower than the +23 volt supply after latch 75 is energized. Latch 75 will thereby remain energized until the +23 volt supply has decreased sufficiently to prevent resumption of deflection generator operation after deenergization of the latch.

A feature of the invention is to enable comparator transistor 76 to be activated under an overcurrent condition. By including zener diode 80 coupled across impedance 82, diode 80 functions as a switch to activate comparator transistor 76 when the diode or switch 80 changes states to, for example, the conductive state.

If a fault condition occurs in high voltage generator 30, such that the beam current loading on ultor terminal U significantly exceeds a beam current draw of $I_{max}$, diode 80 breaks down and becomes conductive. Such an overload condition may occur due to failure of the beam limiter circuit 66 or due to a permanent short-circuiting to ground of the picture tube final anode electrode.

Under a fault condition, when the beam current draw exceeds $I_{max}$, the beam current sense voltage $V_{bc}$ becomes sufficiently negative to draw enough current from terminal 92 through impedance 82 to develop a voltage across the impedance that breaks down diode 80. Any slight decrease in sense voltage $V_{bc}$ due to a slight increase in beam current draw will be applied directly to summation terminal 92 through the relatively small resistance 81 and diode 80 rather than through resistor 81 and the largevalued attenuating resistor 82. The voltage $V_{bc}$ will contribute a greater proportional amount to the summation voltage $V_{sum}$ after diode 80 becomes conductive, enabling the voltage at comparator input base terminal 71 to decrease sufficiently to activate comparator transistor 76 even though excessive ultor voltage is not being generated.

To prevent erroneous activation of comparator transistor 76 when the television receiver is turned on or off by closing or opening on-off switch 21, the supply voltage for reference diode 84 is selected to be substantially larger, at a voltage of +210 volts, than the supply voltage for the sustaining latch current, at a voltage of +16 volts, and is also selected to be substantially larger than the ultor voltage sense voltage $V_{HV}$. The +210 volt supply also rises from zero voltage and decays slower to zero voltage at turn-on and turn-off, respectively, of the television receiver. Additionally, a relatively small value resistor 79 is used to provide bias current for reference diode 74. By these measures, the voltage at terminal 70 during television receiver turn-on and turn-off does not become greater than the voltage at terminal 71, and erroneous activation of comparator transistor 76 is avoided.

A feature of the invention is to provide adequate filtering of the voltages being applied to comparator input terminals 70 and 71 and to the base of latching transistor 77 to prevent erroneous disabling of horizontal deflection generator 32 under transient conditions that may occur during television display operation.

The value of filter capacitor 83 is selected to be large enough to prevent transient peak beam current loading by the television receiver video signal content and transient picture tube arcing from activating transistor 76. If the value of capacitor 83 were too large, abrupt but normal transitions from high brightness scenes to low brightness scenes may erroneously activate comparator transistor 76, because the voltage $V_{HV}$ would increase to its low brightness value faster than would the heavily filtered voltage $V_{sum}$.

During transient arcing, ground loop currents and other pickup may attempt to increase the voltage at the base of latching transistor 77 and turn on first transistor 77 and then transistor 76. An RC network, filter capacitor 85 and resistor 86, is coupled across the base and emitter electrodes of transistor 77 to prevent such erroneous energization of latch 75.

Too large a value for capacitor 85 will bypass base current away from transistor 77 for too long an interval after activation of comparator transistor 76, resulting in a relatively slow regenerative energization of latch 75. Such a slow energization is undesirable because the latch current flowing into the base of driver transistor 35 during the slow energization interval will be insufficient to maintain the transistor in its safe operating area mode of operation. The driver transistor may be unduly stressed into failure.

Filter 91 is coupled across the two input terminals 70 and 71 of comparator 76. During normal television receiver operation, diode 59 is forward biased. Diode 59 prevents transient conditions from decreasing the emitter voltage too greatly and producing destructive reverse breakdown of transistor 76. Resistor 58 enables a negative polarity voltage, as referenced to terminal 71, and of selectable magnitude, to be developed across capacitor 89. A relatively small valued and less costly capacitor 89 may be used while still providing enough delay such that a transient which momentarily increases the voltage $V_{HV}$ does not reverse the polarity across capacitor 89 rapidly enough before disappearing to erroneously activate comparator transistor 76. Thus, by providing the proper amount of precharging of capacitor 89 by the proper selection of resistor 58, a time delay is introduced from the initial increase in voltage $V_{HV}$ until the activation voltage of the comparator is reached to prevent an erroneous activation by transient voltages. Similar considerations apply to erroneous activation due to ground loop pickup at the emitter of transistor 76 during transient arcing.

Increasing the value of capacitor 89 to avoid erroneous activation, rather than increasing the precharging amount in a smaller valued capacitor, is not generally a satisfactory solution. Using a large valued capacitor 89 slows down the latching process of latch 75 and puts undue stress on horizontal driver transistor 35 from initiation to completion of the latching process.

What is claimed is:

1. A protection circuit for a television display requiring an ultor voltage and drawing ultor beam current from an ultor terminal, comprising:
    a source of alternating voltage;
    a high voltage generator responsive to said alternating voltage for developing said ultor voltage at said ultor terminal;
    means responsive to said ultor voltage for developing a sense voltage representative thereof;
    means responsive to said ultor beam current for developing a sense voltage representative thereof;
    a comparator;
    means coupled to said comparator for developing a disabling signal when energized by said comparator;
    means coupled to said disabling signal developing means for applying said disabling signal to said television display such that an abnormal display is produced when said disabling signal developing means is energized;
    means for applying said ultor voltage sense voltage to said comparator to activate said comparator so as to develop said disabling signal when said ultor voltage exceeds a predetermined level;
    means for applying said ultor beam current sense voltage to said comparator so as to vary said predetermined level with variations in said ultor beam current sense voltage; and
    a switch coupled to said comparator and responsive to an overcurrent fault condition in said television display, said switch changing states when said overcurrent fault condition occurs to activate said comparator and produce an abnormal display.

2. A protection circuit according to claim 1 including an impedance coupled to one of two input terminals of said comparator, said switch being coupled to said impedance.

3. A protection circuit according to claim 2 wherein said ultor beam current beam sense voltage applying means is coupled to said impedance and wherein said switch is coupled across said impedance and changes states to activate said comparator when the beam current being drawn from said ultor terminal exceeds a given level indicative of the occurrence of said overcurrent fault condition.

4. A protection circuit according to claim 3 wherein said switch comprises a reverse breakdown diode that becomes conductive when said overcurrent fault condition occurs.

5. A protection circuit according to claim 3 wherein said ultor voltage sense voltage applying means is coupled to one of the two comparator input terminals and including a source of reference voltage coupled to the impedance coupled comparator input terminal, the voltage at said impedance coupled comparator input terminal prior to activation of said comparator comprising the proportional sum of said reference voltage and said ultor beam current sense voltage.

6. A protection circuit according to claims 2 or 3 wherein said high voltage generator comprises a high voltage rectifier arrangement and a transformer with a first winding and a high voltage winding, said first winding having said alternating voltage applied thereto and said high voltage rectifier arrangement being coupled to said high voltage winding and to said ultor terminal for developing said ultor voltage from the voltage across said high voltage winding and wherein said ultor beam current sense voltage developing means comprises an impedance coupled in the DC path of current flowing through said high voltage rectifier arrangement.

7. A protection circuit according to claim 6 wherein said ultor voltage sense voltage developing means comprises a secondary winding of said transformer.

8. A protection circuit according to claim 7 wherein said source of alternating voltage comprises a deflection winding and a deflection generator coupled thereto for generating scanning current in and a retrace pulse voltage across said deflection winding during each deflection cycle, and wherein said alternating voltage comprises said retrace pulse voltage.

9. A protection circuit according to claims 2 or 3 wherein said ultor voltage sense voltage applying means is coupled to one of the two comparator input terminals and including a filter coupled across said two input terminals, said filter comprising a capacitance and the series arrangement of a diode and a resistance coupled across said capacitance, said diode being conductive during normal television display operation to develop a voltage across said capacitance in accordance with the value selected for said resistance.

10. A protection circuit according to claim 9 wherein the value of said resistance is selected so that a transient operating condition occurring within said high voltage generator during television display operation does not activate said comparator.

11. A protection circuit according to claim 9 wherein the voltage across said capacitance during normal television display operation is of a first polarity which prevents activation of said comparator and wherein the voltage across said capacitance reverses polarity during a fault operating condition to activate said comparator.

12. A protection circuit according to claim 11 wherein said filter diode is conductive during normal television display operation and becomes blocked during said fault operating condition.

13. A protection circuit according to claim 12 wherein said comparator comprises a comparator transistor and said two input terminals comprise the base and emitter electrode terminals of said transistor and wherein said first polarity of the voltage across said capacitance is such as to reverse bias said transistor.

14. A protection circuit according to claim 12 wherein said high voltage generator comprises a high voltage rectifier arrangement and a transformer with a first winding and a high voltage winding, said first winding having said alternating voltage applied thereto and said high voltage rectifier arrangement being coupled to said high voltage winding and to said ultor terminal for developing said ultor voltage from the voltage developed across said high voltage winding and wherein said ultor beam current sense voltage developing means comprises an impedance coupled in the DC path of current flowing through said high voltage rectifier arrangement.

15. A protection circuit according to claim 14 wherein said ultor voltage sense voltage developing means comprises a secondary winding of said transformer.

16. A protection circuit according to claim 15 wherein said source of alternating voltage comprises a deflection winding and a deflection generator coupled thereto for generating scanning current in and a retrace pulse voltage across said deflection winding during each deflection cycle, and wherein said alternating voltage comprises said retrace pulse voltage.

17. A protection circuit for a television display requiring an ultor voltage and drawing ultor beam current from an ultor terminal, comprising:
   a source of alternating voltage;
   a high voltage generator responsive to said alternating voltage for developing said ultor voltage at said ultor terminal;
   means for developing a sense voltage representative of said ultor voltage;
   means for developing a sense voltage representative of said ultor beam current;
   a comparator;
   means responsive to the activation of said comparator for developing a disabling signal when energized by said comparator so as to produce an abnormal display when said comparator is activated;
   means for applying said ultor voltage sense voltage to said comparator to activate said comparator so as to develop said disabling signal when said ultor voltage exceeds a threshold level;
   means for applying said beam current sense voltage to said comparator to vary said ultor voltage threshold level as said beam current sense voltage varies; and
   a switch responsive to excessive ultor beam current, said switch changing states when a beam current overload fault condition occurs in order to activate said comparator so as to produce an abnormal display.

18. A protection circuit according to claim 17 wherein said comparator includes two input terminals and wherein said protection circuit includes a filter coupled across said two input terminals, said filter comprising a capacitance and the series arrangement of a diode and a resistance coupled across said capacitance, the values of said capacitance and said resistance being selected so that a transient operating condition occurring within said high voltage generator during television display operation does not activate said comparator.

19. A protection circuit according to claim 18 wherein the voltage across said capacitance during normal television display operation is of a first polarity which prevents activation of said comparator and wherein the voltage across said capacitance reverses polarity during a fault operating condition to activate said comparator.

20. A protection circuit according to claim 19 wherein said filter diode is conductive during normal television display operation and becomes blocked during said fault operating condition.

21. A protection circuit according to claim 20 wherein said comparator comprises a comparator transistor and said two input terminals comprise the base and emitter electrode terminals of said transistor and wherein said first polarity of the voltage across said capacitance is such as to reverse bias said transistor.

22. A protection circuit according to claim 21 wherein said source of alternating voltage comprises a deflection winding and a deflection generator coupled thereto for generating scanning current in and a retrace pulse voltage across said deflection winding during each deflection cycle, and wherein said alternating voltage comprises said retrace pulse voltage, and wherein said high voltage generator comprises a high voltage rectifier arrangement and a flyback transformer with a first winding and a high voltage winding, said first winding having said retrace pulse voltage applied thereto and said high voltage rectifier arrangement being coupled to said high voltage winding and to said ultor terminal for developing said ultor voltage from the voltage developed across said high voltage winding and wherein said ultor voltage sense voltage developing means comprises a secondary winding of said flyback transformer.

23. A protection circuit according to claim 21 wherein said disabling signal developing means comprises a second transistor coupled to said comparator transistor and forming a latch arrangement when energized by said comparator transistor.

24. A protection circuit according to claim 23 including a second filter comprising an RC network coupled across the base and emitter electrodes of said second transistor for preventing transient conditions during normal television display operation which momentarily activate the second transistor from energizing the latch arrangement.

25. A protection circuit according to claim 18 including a second filter coupled to said ultor beam current sense voltage developing means and to said switch for applying a filtered ultor beam current sense voltage to said switch to enable said switch to change states and activate said comparator during beam current loading of sufficient severity to indicate the occurrence of said beam current overload fault condition.

26. A protection circuit according to claim 25 wherein said comparator comprises a first transistor and said two input terminals comprise the base and emitter electrode terminals of said transistor and wherein a first polarity voltage is developed across said capacitance that reverse biases said transistor.

27. A protection circuit according to claim 26 wherein said disabling signal developing means comprises a second transistor coupled to said first transistor and forming a latch arrangement when energized by said first transistor and including a third filter coupled across the base and emitter electrodes of said second transistor to prevent a transient condition from energizing the latch arrangement.

28. A protection circuit according to claim 27 wherein the diode of the first-mentioned filter is conductive during normal television display operation to develop said first polarity voltage across said capacitance and of a voltage magnitude that is determined by the selection of the value of the resistance of the first-mentioned filter.

29. A protection circuit according to claim 28 wherein an increase in said ultor voltage above said threshold level of sufficient severity to indicate faulty high voltage generator operation enables said ultor voltage sense voltage to block conduction of said filter diode and charge said filter capacitance to an opposite polarity voltage that energizes said latch arrangement.

30. A protection circuit according to claims 17, 18, 25 or 29 including an impedance coupled across said switch, and wherein said switch comprises a reverse breakdown diode normally nonconductive, the current flowing in said impedance during said beam current overload fault condition producing a voltage thereacross that results in said reverse breakdown diode being conductive to activate said comparator.

* * * * *

UNITED STATES PATENT AND TRADEMARK OFFICE
CERTIFICATE OF CORRECTION

PATENT NO. : 4,345,275
DATED : August 17, 1982
INVENTOR(S) : George C. Waybright It is certified that error appears in the above—identified patent and that said Letters Patent is hereby corrected as shown below:

COLUMN 6, LINE 47:

that portion reading "current beam sense"

should read -- current sense --.

Signed and Sealed this

Eleventh Day of January 1983

[SEAL]

Attest:

Attesting Officer

GERALD J. MOSSINGHOFF

Commissioner of Patents and Trademarks